Oct. 5, 1943.  W. H. NEELY  2,330,906
WIRE SPRINGS FOR CUSHIONED SEATS
Filed May 17, 1940  2 Sheets-Sheet 1
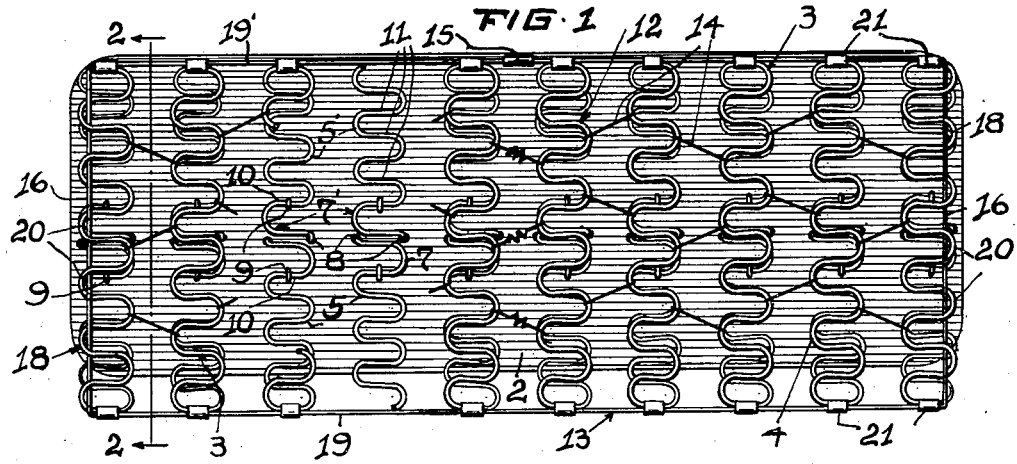
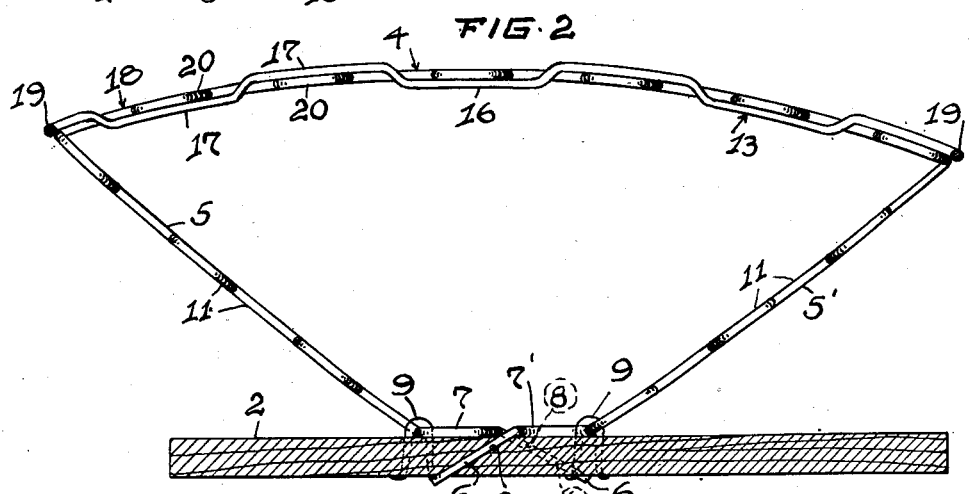
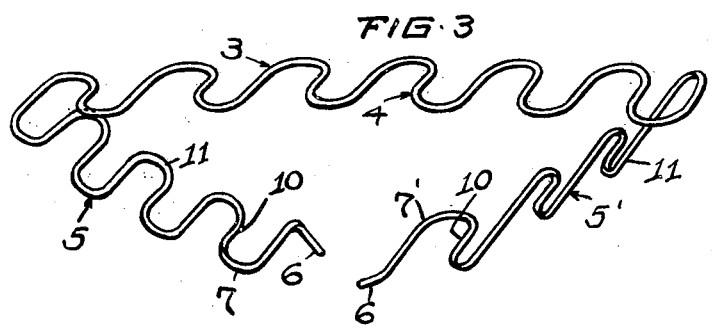
INVENTOR.
WILLIAM H. NEELY
BY Gustav A. Wolff

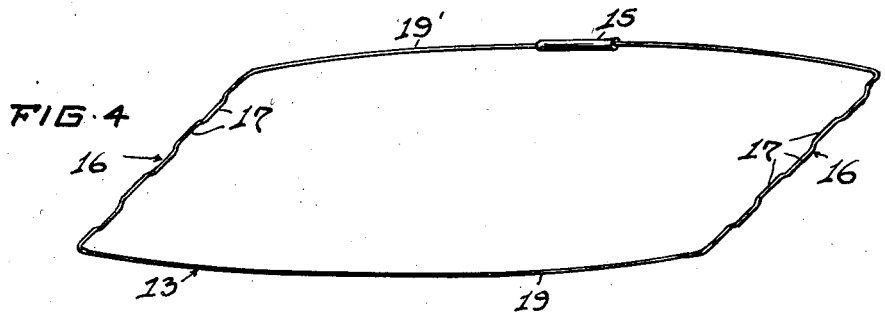
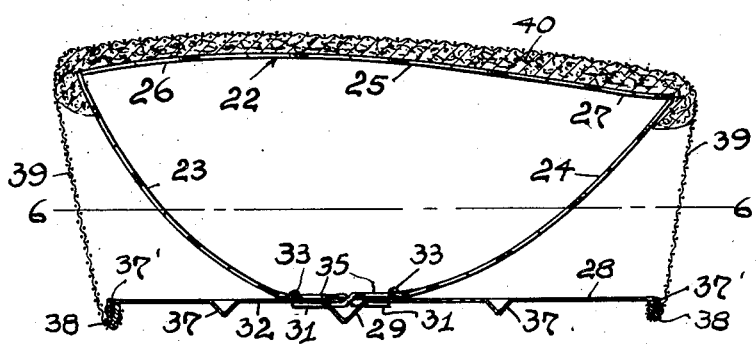
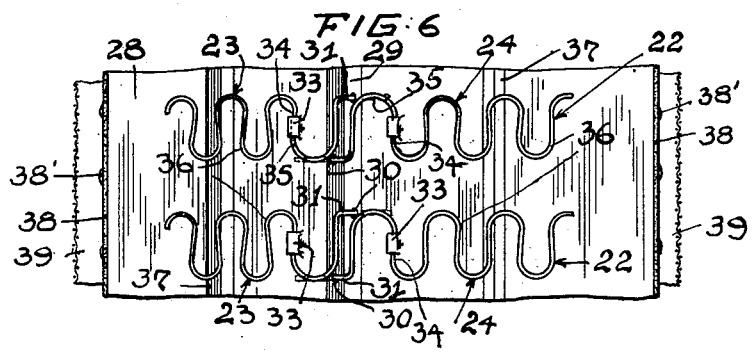
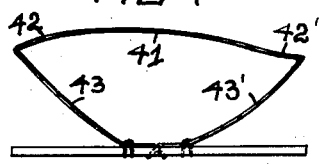
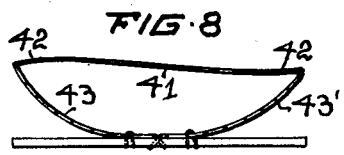

Patented Oct. 5, 1943

2,330,906

UNITED STATES PATENT OFFICE 2,330,906

WIRE SPRING FOR CUSHIONED SEATS

William H. Neely, Cleveland, Ohio, assignor, by mesne assignments, to The Universal Wire Spring Company, Cleveland, Ohio, a corporation of Ohio Application May 17, 1940, Serial No. 335,774

9 Claims. (Cl. 155—179)

This invention relates in general to improvements in flat wire springs of sinuous or similar shape of the class shown and described in Patent No. 2,047,411 to Morris Freund, dated July 14, 1936; and, more particularly, to simplified spring means and spring constructions for suitably covered cushioned seats and backs, such as are employed in automobiles, busses, upholstered furniture, etc.

The primary object of the present invention is to generally improve upon springs and spring constructions for seats and backs of this class, and, particularly, to provide flexibly-resilient springs of simple and inexpensive construction resiliently supporting a load placed thereon and readily and easily attachable to or removable from a supporting structure of simplest construction.

This general object of the present invention is attained by the provision of substantially triangularly shaped, corrugated wire springs which include a resting portion and downwardly converging supporting arms extended from the resting portion and formed at their ends with inwardly and downwardly extended means for supporting and attaching the springs substantially centrally below their resting portions to a supporting structure.

Another object of the invention is the provision of substantially triangularly shaped, corrugated wire springs of the type described above which include at the ends of their supporting arms means for interlocking with a supporting structure to permit pretensioning of the springs in a simple and economic manner.

A further object of the invention is the provision of wire springs of the type described which are shaped from a single continuously corrugated wire bent to substantially triangular shape, the wire being provided at its ends with inwardly and downwardly extended mounting and attachment means for rigidly mounting said springs substantially centrally below their resting portions.

In addition, the invention has other marked improvements and superiorities which radically distinguish it from presently known structures. These improvements or superior characteristics embodying certain novel features of construction are clearly set forth in the appended claims, and a preferred embodiment of the invention is hereinafter shown with reference to the accompanying drawings, forming part of the specification.

In these drawings:

Fig. 1 is a plan view of a spring seat structure embodying corrugated wire springs according to the invention, some of the springs being shown partly broken away to clearly disclose their attachment to a base board.

Fig. 2 is an enlarged cross sectional view on line 2—2 of Fig. 1.

Fig. 3 is a perspective view of one of the springs used in the assembly of the spring seat structure shown in Fig. 1.

Fig. 4 is a perspective view of the edge wire structure interconnecting the springs in the spring seat structure shown in Fig. 1.

Fig. 5 is a cross sectional view similar to Fig. 2 through a seat structure with a metal base board; and Fig. 6 a fragmentary plan view of the structure of Fig. 5 showing the interlocking engagement of the springs with the metal base board.

Figs. 7 through 9 are diagrammatical views of a spring made in accordance with the invention showing the different shapes of the spring when unloaded and under different loads; thus Fig. 7 is a diagrammatical view of a slightly pretensioned unloaded spring mounted on a frame.

Fig. 8 is a diagrammatical view of the spring shown in Fig. 7 carrying a light load; and Fig. 9 is a diagrammatical view of the spring shown in Fig. 7 carrying a heavy load.

Referring now in detail to the exemplified form of the seat structure shown in Figs. 1 and 2 of the drawings, reference numeral 2 represents a straight wooden board which supports crosswise thereof a plurality of parallelly arranged, flat wire springs 3. These springs are formed from a continuous, preferably slightly curved, sinuously shaped or horizontally corrugated steel wire and each embodies a slightly curved seating portion 4 and downwardly and inwardly extended, slightly outwardly curved supporting arms 5, 5' respectively. Arms 5, 5' which are integrally extended from the opposite ends of seating portion 4 and substantially symmetrically arranged with respect to each other and seating portion 4, support the seating portion in elevated position and have their free ends formed with straight extensions 6, angularly related with respect to arms 5, 5'. In addition, arms 5, 5' have their last bends 7, 7' respectively, angularly offset with respect to the axes of the arms for a purpose hereinafter to be described. Extensions 6 secure springs 3 to base board 2, and this board is provided with pairs of inclined bores 8 arranged in such a manner that the bores of each pair are inclined in opposite directions and spaced from each other a distance approximately equal to the width of wire springs 3.

Extensions 6 fully extend through the bores 8, and bends 7, 7' rest upon board 2 and are secured thereto by means of staples 9 engaging straight portions 10 of springs 3, which portions are located between last bends 7 and adjoining bends 11. This arrangement effects rigid mounting of the springs and secures proper yielding action of arms 5, 5' and bends 7, 7' when springs 3 are loaded, as staples 9 permit slight torsion of straight portions 10 which connect arms 5, 5' with the bends 7, 7'.

The springs 3 have their seating portions 4 interconnected with each other to a seating surface 12 by an edge wire 13 and hook members 14. Edge wire 13 is formed from a continuous wire bent to rectangular shape and connected at its ends by a clip 15, and the side portions 16 of the edge wire are formed with parallel offsets 17 to permit of alternate engagement of these side portions with the top and bottom faces of seating portions 4 of the two outer springs 18, 18' of the seat structure. In addition, edge wire 13, when fully assembled, has its front and rear portions 19, 19' bulged outwardly to facilitate interengagement of the side portions 16 with bends 20 of outer springs 18, 18' and effect proper spacing of said springs when front and rear portions 19, 19' of the edge wire are forced toward springs 3 and secured thereto by means of clips 21.

In the modified form of the invention shown in Figs. 5 and 6 of the drawings, the substantially triangularly shaped corrugated wire springs 22 are provided with front and rear supporting arms 23, 24, the latter being slightly longer than the front supporting arms 23, and seating portions 25 having at 26, near their front ends, an increase in curvature and at 27, near their rear ends, a change in curvature from convex to concave. This construction mounts the corrugated wire springs on a metal board 28, having in its central area a V-shaped recess 29 and perforations 30 which are equivalent to bores 8 in base board 2. For proper mounting of springs 22 on metal board 28 extensions 31 at the ends of supporting arms 23 and 24 are parallelly offset to effect proper contact of these extensions with the bottom face 32 of board 28, and board 28 embodies struck-up portions 33 bent around straight portions 34 of the springs, which portions are located between the angularly offset bends 35 and the adjacent bends 36 of supporting arms 23, 24. However, it should be understood that any other practical attachment may be used. Base board 28 is stiffened by longitudinal ribs 37 and has its front and rear portions provided with downwardly extended flanges 37', which flanges support tacking strips 38, partly embracing the flanges and secured thereto by rivets 38'. These tacking strips permit of proper attachment of a covering 39 for the spring structure, which preferably is lined with padding material 40.

Springs of the type shown in the seat structure are preferably pretensioned in order to obtain the desired yielding support of a load by these springs; and such pretensioning of the springs can readily be controlled by a change in the angular relationship of extensions 6 and bends 7, 7' with respect to arms 5, 5', or by a change in the angle of bores 8 in base board 2. Furthermore, pretensioning of these springs can be controlled by the curvature given to the corrugated wire from which the springs are formed and finally, an increase, decrease or change in the curvature near the ends of the seating portions can be used for such a purpose, as will best be understood from an inspection of the diagrams of Figs. 7, 8 and 9 indicating the form of an unloaded, lightly loaded and heavily loaded spring. In these figures the diagram of Fig. 7 discloses an unloaded spring with a slightly curved seating portion 41 which at its left or front end 42 includes an increase in the curvature of the seating portion and at the right or rear end at 42' of said seating portion a slightly inverted curvature. It will also be noted that the converging supporting arms 43, 43' respectively, are slightly outwardly curved, which greatly facilitates bending of these arms under load, as will more readily be understood from inspectiion of the diagrams of Figs. 8 and 9.

The diagram of Fig. 8 discloses the shape of the spring when under a light load. It will be noted that seating portion 41 is substantially straightened out without having formed upwardly extended so-called hard areas. Such shape of the seating portion of the spring is effected by the spreading action of supporting arms 43, 43'. These arms have been straightened out in their end areas, and in their areas adjacent to the seating portion have substantially increased their curvatures, so as to avoid excessive upwardly directed forces interfering with the desired yielding of the surface of the seating portion. The curvature at the front end of the seating portion and the inverted curvature at the rear end of said portion also have been straightened out, the curvature at the front end of the seating portion having effected the desirable increase in curvature at the upper portion of front supporting arm and the inverted curvature at the rear end of the seating portion having effected straightening of the rear part of the seating portion without forming excessive hard areas in this part.

The diagram of Fig. 9 discloses the shape of the spring under a heavy load. It will be noted from the diagram of this figure that seating portion 41 now is invertedly curved and supporting arms 43, 43' are straightened out over a longer distance at their end portions and simultaneously more sharply curved at their portions adjacent to the seating portion. Such shape of the supporting arms effects substantial tensional stresses and upwardly directed bulging forces in the seating portion which counteract excessive downward bulging of said portion.

Obviously the length of supporting arms 43, 43' for the seating portion may vary in length to obtain a slightly rearwardly inclined seating structure together with a slight decrease in the yielding action of rear supporting arm 43'.

Having thus described my invention, what I claim is:

1. A spring for cushioned seats and the like comprising a substantially triangularly shaped wire member embodying a slightly upwardly curved, corrugated seating portion including at its rear portion a short, downwardly curved end portion; slightly outwardly curved, corrugated, converging supporting arms; and means on the end portions of said arms for mounting and attaching said arms to a supporting member, the ends of said converging supporting arms being arranged below the central area of said seating portion.

2. A spring for cushioned seats and the like comprising a substantially triangularly shaped wire member embodying a slightly upwardly curved, corrugated seating portion including at its front end a short sharper curved end area and at its rear end an invertedly curved end area; slightly outwardly curved, corrugated, converging supporting arms for said seating portion integrally extended therefrom; and means on the end portions of said arms for mounting and attaching said arms to a supporting member, the ends of said converging supporting arms being arranged below the central area of said seating portion.

3. A spring for cushioned seats and the like comprising a substantially triangularly shaped wire member embodying a corrugated seating portion; corrugated, converging supporting arms including corrugated end portions angularly and inwardly offset with respect to the axes of said arms; and means extended from said end portions for attaching said arms to a supporting member, said corrugated end portions being adapted to rest on a supporting member when said attaching means are secured thereto.

4. A spring for cushioned seats and the like comprising a horizontally corrugated wire member embodying a corrugated seating portion; downwardly extended corrugated, converging supporting arms for said seating portion; and angularly offset inwardly extended corrugated end bends on said supporting arms, the axes of said seating portions, arms and end bends being arranged in a single plane.

5. A seat structure comprising in combination a supporting base having symmetrically arranged bores therein, and a spring unit of substantially triangular shape secured to said frame, said spring unit being formed from a continuous, corrugated wire and comprising a seating area, resilient, converging supporting arms, and substantially straight extensions at the ends of said arms, said extensions being threaded into and partly through said bores for attaching and mounting said spring unit on said supporting base.

6. A seat structure comprising in combination a supporting board having symmetrically arranged, inclined bores therethrough, and a spring unit of substantially triangular shape secured to said board, said spring unit being formed from a continuous, corrugated wire having open loops and comprising a seating area, resilient, converging supporting arms including inwardly offset end bends, and substantially straight downwardly inclined extensions at the ends of said end bends, said extensions being threaded into and partly through said bores in said board and said end bends being seated upon and fastened to said board.

7. A seat structure as described in claim 6, wherein said spring unit is formed from a slightly curved, corrugated wire to slightly curve said seating area and supporting arms, and wherein a portion of each of said end bends is pivotally secured to said board for co-operation of the loops of said end bends with the other portions of said supporting arms when said spring unit is pretensioned and when a load is placed on said spring unit.

8. A seat structure comprising in combination a supporting base having symmetrically arranged bores therein, and a spring unit of substantially triangular shape secured to said frame, said spring unit being formed from a continuous corrugated wire having open loops and comprising a seating area, converging supporting arms including inwardly offset end bends, and substantially straight extensions at the ends of said end bends, said extensions being threaded into and partly through said bores for attaching and mounting said spring unit on said supporting base, and said end bends being forcibly secured to said base for pretensioning said spring unit.

9. A seat structure as described in claim 8, wherein said spring unit is formed from a slightly curved, corrugated wire to slightly curve said seating area and supporting arms, and wherein a portion of each of said end bends is pivotally secured to said supporting base for co-operation of the loops of said end bends with the other portions of said supporting arms when said spring unit is pretensioned and when a load is placed on said spring unit.

WILLIAM H. NEELY.